(12) United States Patent
Halvarsson et al.

(10) Patent No.: US 7,616,087 B2
(45) Date of Patent: Nov. 10, 2009

(54) INSTALLATION FOR TRANSMISSION OF ELECTRIC POWER

(75) Inventors: Per Halvarsson, Västerås (SE); Claes Bengtsson, Ludvika (SE); David Larsson, Stockholm (SE); Johan Karlstrand, Karlskrona (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/528,201

(22) PCT Filed: Sep. 12, 2003

(86) PCT No.: PCT/SE03/01426

§ 371 (c)(1),
(2), (4) Date: Sep. 27, 2005

(87) PCT Pub. No.: WO2004/027958

PCT Pub. Date: Apr. 1, 2004

(65) Prior Publication Data

US 2006/0096953 A1    May 11, 2006

(30) Foreign Application Priority Data

Sep. 17, 2002    (SE)    ................................ 0202751

(51) Int. Cl.
*H01F 27/28*    (2006.01)
(52) U.S. Cl. .................... 336/222; 307/105; 307/74; 174/106 SC
(58) Field of Classification Search ................ 336/222; 307/105
See application file for complete search history.

(56) References Cited

U.S. PATENT DOCUMENTS

| 3,412,199 | A | | 11/1968 | Yeh |
| 3,942,100 | A | * | 3/1976 | Kauferle et al. ............. 323/210 |
| 4,751,488 | A | | 6/1988 | Lanoue et al. |
| 4,785,138 | A | * | 11/1988 | Breitenbach et al. .. 174/106 SC |
| 5,053,910 | A | * | 10/1991 | Goldstein .................... 361/111 |
| 5,716,574 | A | * | 2/1998 | Kawasaki ............. 264/171.17 |
| 6,441,712 | B2 | * | 8/2002 | Ainsworth ................... 336/160 |
| 2003/0123648 | A1 | * | 7/2003 | Ashton et al. ............... 379/403 |

FOREIGN PATENT DOCUMENTS

| EP | 0825465 | A1 | | 2/1998 |
| FR | 0825465 | A1 | * | 2/1998 |
| JP | 62188304 | A | | 8/1987 |
| JP | 6261456 | A | | 9/1994 |
| JP | 06261456 | A | * | 9/1994 |

* cited by examiner

*Primary Examiner*—Elvin G Enad
*Assistant Examiner*—Joselito Baisa
(74) *Attorney, Agent, or Firm*—Venable LLP; Eric J. Franklin

(57) ABSTRACT

An installation for transmission of electric power via a high-voltage ac voltage line between two switchgear units located at a large distance from each other. For the transmission of the electric power, the ac voltage line includes at least one extruded cable with an inner electric conductor, an insulating layer of a solid material surrounding the conductor, and an outer screen layer located at ground potential. The installation also includes one or more inductors located along the extent of the cable between the switchgear units and integrated into the cable. The inductors are connected between the conductor of the cable and ground for reactive shunt compensation.

23 Claims, 2 Drawing Sheets

INSTALLATION FOR TRANSMISSION OF ELECTRIC POWER

CROSS-REFERENCE TO RELATED APPLICATIONS

This application claims priority to Swedish patent application No. 0202751-4 filed 17 Sep. 2002 and is the national phase under 35 U.S.C. § 371 of PCT/SE2003/001426.

FIELD OF THE INVENTION AND BACKGROUND ART

The present invention relates to an installation for transmission of electric power via a high-voltage ac voltage line between two switchgear units located at a large distance from each other.

The invention is not limited to a certain number of phases of the ac voltage line, but this line could, for example, be a single-phase line just as well as a three-phase line.

The term "high-voltage" in this context means a system voltage exceeding at least 10 kV, and typically such a voltage is between 50 kV and 500 kV.

The definition "switchgear units located at a large distance from each other" is to be interpreted as a distance that is at least so large that the use of extruded cables with an inner electric conductor, an insulating layer of solid material surrounding this conductor, and an outer screen layer located at ground potential has been considered to be an impossible alternative for the formation of the above-mentioned ac voltage line because of the high capacitive currents that would be generated in such long cables and make the current handling capacity of the line unacceptably low. In practice, this normally means distances exceeding at least 25 km. In such installations, non-insulated overhead lines have primarily been used in order to form the ac voltage line mentioned. However, such overhead lines have a relatively great disturbing influence on nature and living beings, where they are drawn. The alternative has been to use cables with an inner conductor surrounded by a thick insulating sheath formed from oil-impregnated paper, but such cables are so expensive that they do not constitute a realistic alternative to the overhead lines. An extruded cable as mentioned above may be provided at a cost that, in combination with the advantages it exhibits with respect to environmental impact, would make it competitive with respect to the overhead lines, but it has not been possible to use it in installations of this kind because of the problems mentioned above. The conclusion has been that, to use such a cable for an ac voltage line as mentioned above, it would have been necessary to place a plurality of substations with switchgear units between the above-mentioned two switchgear units located at a large distance from each other, so that, in actual fact, the distance would not become large but instead small between two adjacently located switchgear units. This would have become unreasonably expensive and has therefore not been a conceivable solution.

SUMMARY OF THE INVENTION

The object of the present invention is to provide an installation of the kind defined in the introduction, which is improved in relation to prior art installations of this kind.

This object is achieved according to the invention in that, in such an installation, the ac voltage line for transmission of the electric power is provided with at least one extruded cable with an inner electric conductor, an insulating layer of solid material surrounding this conductor, and an outer screen layer located at ground potential, and in that the installation, in addition, is provided with one or more inductors arranged along the extent of the cable between the switchgear units and integrated into the cable, the inductors being connected between the conductor of the cable and ground for reactive shunt compensation.

Because inductors are integrated into the cable in this way, the capacitive currents produced in the cable may be compensated for and a satisfactory current handling capacity may be imparted to such a cable even if it extends over long distances. This means that the advantages possessed by an extruded cable over an overhead line with respect to a greatly reduced disturbing influence on nature and living beings and in relation to cables with insulation of oil-impregnated paper with regard to the cost may be utilized in such an installation for transmission of electric power via a high-voltage ac voltage over long distances. The above-mentioned integration of inductors into the cable permits a reactive compensation to be made at a reasonably low cost that only constitutes a fraction of what the above-mentioned substations with switchgear units would have involved.

The integration of the above-mentioned inductors into the cable and the fact that the cost of these is relatively low, which means that they may be arranged relatively close together, makes it possible to use a cable that is relatively thin for a given voltage level, which, admittedly, gives a higher capacitive coupling and therefore a greater problem with capacitive currents than a thicker cable, but the inductors according to the invention deal with this problem. One advantage of using as thin a cable as possible is that larger quantities of the cable may be run out at a time on a drum and be laid such that there will be a longer distance between the joints of the cable, and such joints are costly. Such a relatively close arrangement of inductors also permits these inductors to be dimensioned to be relatively small.

By "inductors integrated into the cable" is meant that the inductors are arranged in immediate proximity to the cable. In the case of a polyphase line, this line exhibits one such cable per phase. In this context, each cable exhibits integrated inductors, but the inductors could be of a polyphase type such that one inductor is common to several cables.

According to a preferred embodiment of the invention, the installation comprises several such inductors, distributed along the line at a considerable mutual distance, and preferably the inductors are essentially uniformly distributed along the line. In this way, the current handling capacity in the conductor of the cable will be influenced by capacitive currents only during each section between adjacent such inductors, and because of the compensation achieved through the inductors, the current handling capacity of the conductor will be limited to an insignificant degree. In this way, it will be possible to arrange an ac voltage line of this kind with one or more cables with a very long distance between the switchgear units mentioned.

According to another preferred embodiment of the invention, the inductor is completely or partially buried into the ground, which is advantageous since the connections between the inductor and the cable under the ground eliminate the requirement for protection and thus reduces the cost of the installation.

According to another preferred embodiment of the invention, the inductor comprises a winding that is arranged in a casing located at ground potential and that is connected by one end to the electric conductor of the cable and by its other end to the casing.

According to another preferred embodiment of the invention, the inductor is provided with an auxiliary winding for delivering auxiliary energy to a consumer, such as equipment for operation of parts of the installation and communication between such parts and/or between the installation and external equipment. This provides a possibility, simultaneously with the cable being installed, of supplying a plurality of different consumers, such as those mentioned above, with electric power. The cost of such a supply winding in the inductor is very low compared with separate pulling of cables to a consumer as mentioned above.

According to another preferred embodiment of the invention, the installation comprises an optical fibre, laid along the cable or integrated into the cable, for use of a device for protection of the installation and/or commercial communication within the installation and/or with the surroundings. Such an optical fibre may, in this way, be laid in a simple manner when the cable is being laid, such that different types of protection equipment for protection of the cable and the inductors or other parts of the installation may "talk" to each other, and when this is done it may just as well be designed for other applications in the form of commercial communication, such as for telecommunications.

According to another preferred embodiment of the invention, the ac voltage line exhibits three phases with one cable of the above-mentioned kind for each phase and the inductor is of three-phase type with the cables of the respective phase connected to a separate inductor winding of a respective phase leg of a common core. Such a design of a common inductor for all three cables could in certain situations lead to a more advantageous arrangement of the inductor than if a separate inductor were to be arranged for each cable and/or lead to a saving of costs. However, it should be pointed out that it is fully possible to arrange, in the three-phase case, along the extent of the cables, a separate inductor for each cable.

Advantageously, the dimensioning of an inductor of the above-mentioned kind and the distance between adjacently located inductors and between such an inductor and a switchgear unit, respectively, are adapted to the magnitude of the voltage the cable in question is intended to carry and the shunt capacitance/unit of length of the cable to essentially eliminate capacitive currents in the cable. Thus, when the inductors are arranged more closely together, these may be made smaller. At a given size of the inductors, these must be arranged more closely together the higher the above-mentioned voltage is and the greater the shunt capacitance/unit of length of the cable is.

Further advantages and advantageous features of the invention will be clear from the following description and the other dependent claims.

BRIEF DESCRIPTION OF THE DRAWINGS

Preferred embodiments of the invention will be described below with reference to the accompanying drawings, wherein.

DETAILED DESCRIPTION OF PREFERRED EMBODIMENTS OF THE INVENTION

Figure 1:
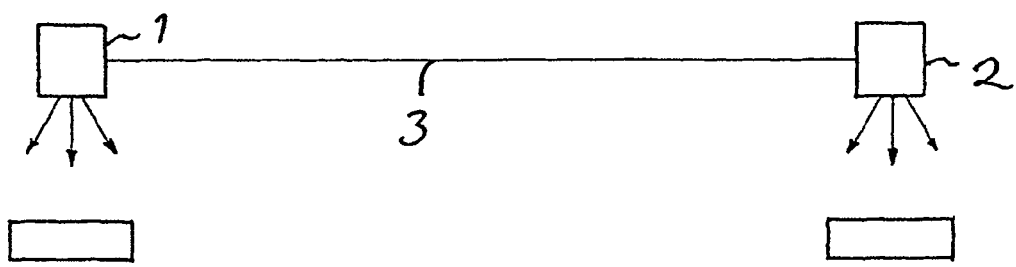
FIG. 1 is a very schematic sketch illustrating the type of installation to which the invention relates.

FIG. 1 illustrates very schematically an installation for transmission of electric power via a high-voltage ac voltage of the kind to which the invention relates, namely, comprising two schematically indicated switchgear units 1, 2, located at a large distance from each other and connecting the ac voltage line 3. In the present case, the ac voltage line is formed from one extruded cable per phase, and the composition of such a cable will be described further on with reference to FIG. 2. This cable is designed to have a system voltage of between 50 kV and 500 kV, preferably of between 30 kV and 300 kV between its conductor and ground. The installation is preferably designed for a maximum transmissible power, via the ac voltage line, of 50 MW-600 MW. The distance between the two switchgear units preferably exceeds 25 km and may typically be within the range of 50 km-300 km.

Figure 2:
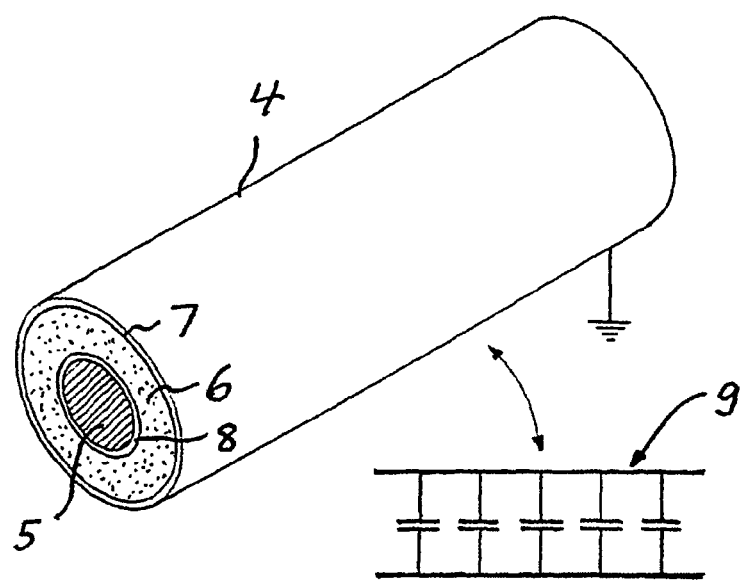
FIG. 2 is a partially cut-away view illustrating the composition and function of a cable used in an installation according to the invention for transmission of electric power.

FIG. 2 shows a possible appearance of an extruded cable, included in the ac voltage line 3. The cable 4 exhibits an inner electric conductor 5, a relatively thick insulating layer 6 of solid material surrounding the conductor, and an outer screen layer 7 located at ground potential. In addition, the cable preferably comprises an inner layer 8, arranged nearest the conductor 5, with an electrical conductivity that is lower than the electrical conductivity of the conductor but sufficient to cause this inner layer to act in a potential-equalizing manner to equalize the electric field externally of this inner layer. The screen layer 7 has an electrical conductivity that is higher than that of the insulating layer to render the screen layer capable of functioning in a potential-equalizing manner, through connection to ground, and to essentially enclose the electric field that arises inside the screen layer as a result of the electric conductor. Although its presence is to prefer, the inner layer 8 could be omitted. The cable is advantageously of an extruded type, in which the insulating layer 6 is of cross-linked polyethylene.

FIG. 2 also schematically illustrates the equivalent circuit 9 to the cable 4. The voltage that is applied between the conductor 5 of the cable and the screen layer 7 across the intermediate insulating layer 6 will result in a capacitive coupling (illustrated by the capacitors in the equivalent circuit) between the conductor and the screen layer, the size of which increases with increasing voltage drop per mm of thickness of the insulating layer 6, that is, with a higher electric field. This results in a capacitive current $I_c$ through the cable that may be calculated according to the following formula:

$$I_c = U \cdot 2\pi \cdot f \cdot C$$

Here, U is the voltage between the conductor 5 and the screen layer 7, f is the frequency with which the voltage varies, and C is the capacitance of the cable. Unless any special measures are taken, this capacitive current will take up an unacceptably large part of the current handling capacity of the cable, such that the ability of the cable to transmit active power is reduced to too low a level.

However, the present solution solves this problem by integrating into the cable, along the extent of the cable between the switchgear units, one or more inductors connected between the conductor 5 of the cable and ground 7 for reactive shunt compensation. How to achieve this is illustrated in FIG.

Figure 4:
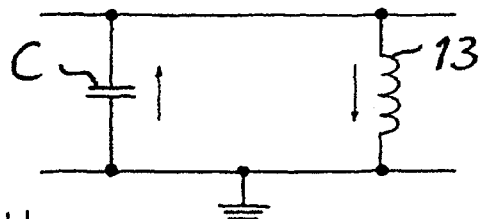
FIG. 4 is a schematic sketch illustrating what is achieved through the present invention.

3 for a cable. The cable 4 is here divided at the location for connection of the inductor into two parts 4', 4", which are each connected by their inner conductor to a connection device 10, 11. The connection devices 10, 11 are arranged in a casing 12 that is located at ground potential and that encloses the inductor. The inductor 13 has a winding that is connected by one end to a connection device 14 and by its other end 15 to the casing. A member 25 is adapted to electrically connect the three connection devices 10, 11 and 14 to one another. In this way, the inductor will be connected in parallel with the capacitance C of the cable in the way illustrated in FIG. 4. This will cause a reactive current to be generated through the inductor 13, which current will compensate for the capacitive current produced in the cable. In this way, it will be possible to significantly increase the current handling capacity of the cable, and hence the ability to transmit active power, such that the capacitive currents in the cable may be considered to be essentially eliminated.

Figure 5:
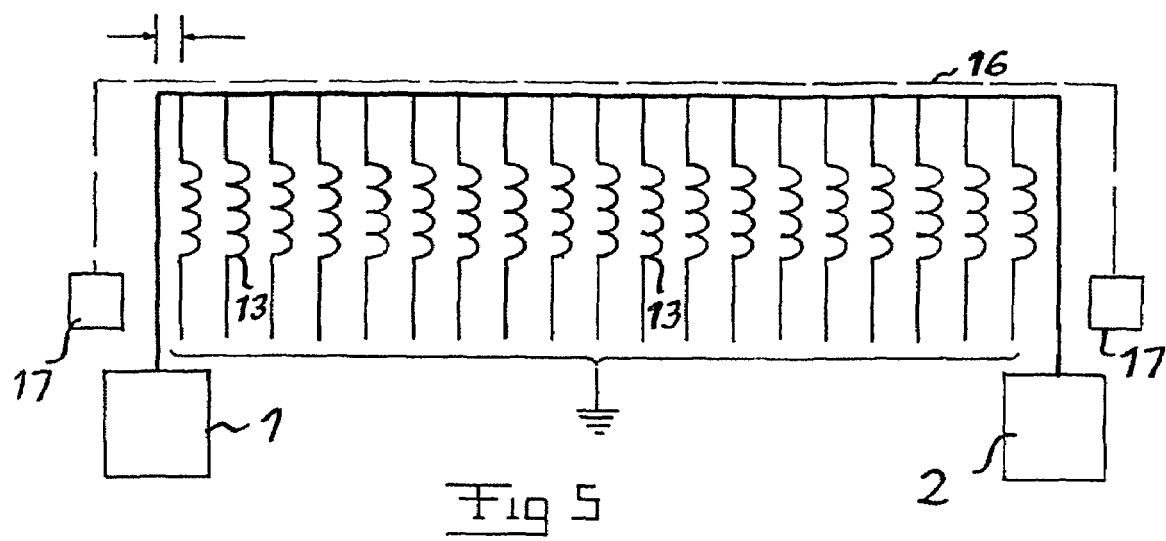
FIG. 5 is a schematic view illustrating an installation according to one preferred embodiment of the invention.

A suitable dimension of an inductor of the above-mentioned kind is for a reactive power of 5-30 MVAr. Preferably, such inductors are essentially uniformly distributed along the ac voltage line, that is, along the cable or cables, as schematically illustrated in FIG. 5. In this context, feasible distances between adjacently located inductors are 5-40 km, preferably 10-25 km. In the embodiment shown in FIG. 5, two switchgear units 1, 2 are arranged at a mutual distance of about 200 km. With a mutual distance of 20 km, inductors of 10 MVAr are integrated with the cable in the manner described above. The cable is here an XLPE cable (cross-linked polyethylene) with a conductor that has a cross section of 300 mm$^2$ and that is designed for a system voltage of 132 kV. This device entails a very good compensation of the capacitive currents through the inductors 13 which are generated in the cable.

This figure also schematically illustrates how an optical fibre 16 is laid along the cable or integrated into the cable for use of a device 17 for protection of the installation, especially the cable and the inductors, and for communication between different parts of the installation. The optical fibre may also advantageously be used for commercial communication, such as for telecommunications.

Figure 3:
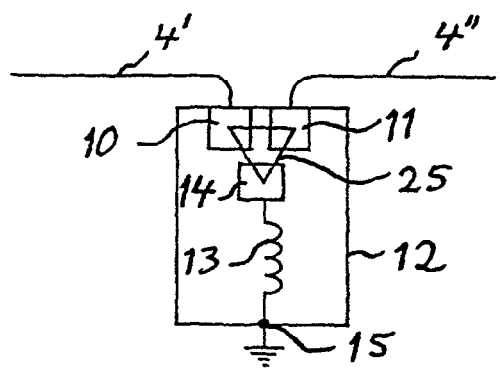
FIG. 3 is a schematic view illustrating an integration of an inductor with a cable in an installation according to a preferred embodiment of the invention.
Figure 6:
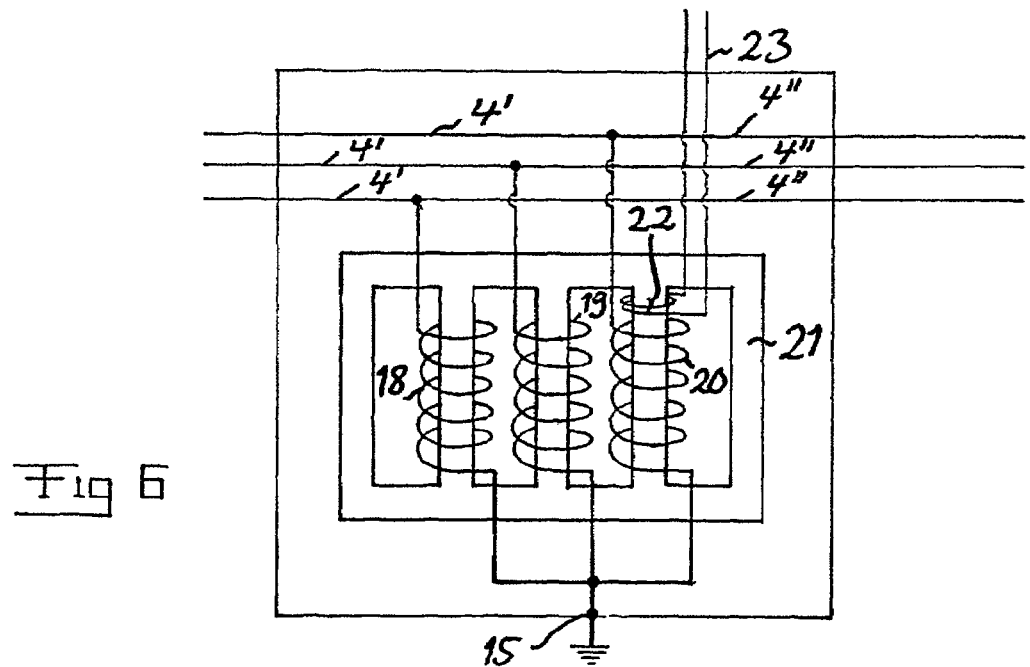
FIG. 6 is a schematic view of part of an installation according to another preferred embodiment of the invention.

In the case of a three-phase line, inductors of the kind shown in FIG. 3 may very well be used and connected to respective phase cables, but it is also possible to arrange an inductor as illustrated in FIG. 6, which is common to the phases. This inductor has three separate inductor windings 18-20 arranged on respective phase legs of a common core 21 and they are each connected to the respective phase cable on their upstream side and to a common ground connection on their downstream side. FIG. 6 also illustrates how it is possible to provide the inductor with an auxiliary winding 22 for delivering auxiliary energy via circuits 23, connected to the auxiliary winding, to optional consumers or loads. This provides a possibility, simultaneously with the cable being installed, of supplying a plurality of different consumers with power, such as communication equipment, etc. This can be done in a very cost-effective way.

Figure 7:
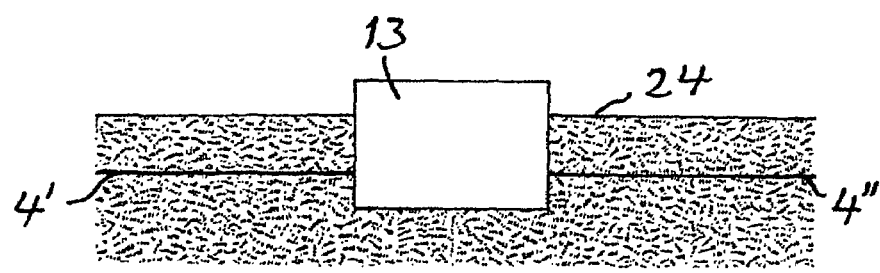
FIG. 7 is a very simplified view of part of an installation according to yet another preferred embodiment of the invention.

FIG. 7 schematically illustrates how an inductor 13, which is integrated into a cable 4', 4", could be arranged completely or partially buried in the ground. The ground level is indicated by 24. In this way, the cable connections will be located below ground level and hence the requirements for protection thereof will be eliminated.

The invention is not, of course, limited to the preferred embodiments described above, but a number of possibilities of modifications thereof should be obvious to a person skilled in the art without deviating from the basic concept of the invention as defined in the appended claims.

For example, one single inductor could be integrated with the cable in those cases where the distance between two switchgear units is not too large, such as, for example, of the order of magnitude of 10-30 km.

The inductor may be of a varying type and also be designed as a so-called controllable reactor, that is, with a possibility of adjusting its inductance to the prevailing operating conditions of the installation.

The invention claimed is:

1. An installation for transmission of electric power, comprising:
    two switchgear units;
    a high-voltage ac voltage line extending between the switchgear units, wherein the high-voltage exceeds at least 10 kV, the ac voltage line comprising at least one extruded cable including an inner electric conductor, an insulating layer of a solid material surrounding said conductor, and an outer screen layer located at ground potential;
    at least one inductor located along the cable between the switchgear units and integrated into the at least one extruded cable, the at least one inductor being connected between the conductor of the at least one extruded cable and ground; and
    a casing through which the cable is lead, the casing being located at ground potential, and the at least one inductor being arranged in the casing, wherein a first end of the at least one inductor is connected to the electric conductor and a second end of the at least one inductor is connected to the casing.

2. The installation according to claim 1, wherein the switchgear units are located at a large distance from each other.

3. The installation according to claim 1, wherein the installation comprises a plurality of inductors distributed along the ac voltage line.

4. The installation according to claim 3, wherein the plurality of inductors are arranged at considerable distances from each other.

5. The installation according to claim 3, wherein said inductors are essentially uniformly distributed along the ac voltage line.

6. The installation according to claim 1, wherein the insulating layer comprises cross-linked polyethylene.

7. The installation according to claim 1, wherein the cable further comprises an inner layer arranged nearest the conductor and having an electrical conductivity that is lower than an electrical conductivity of the conductor but sufficient to cause the inner layer to act in a potential-equalizing manner to equalize the electric field externally of the inner layer, and wherein the screen layer has an electrical conductivity that is higher than an electrical conductivity of the insulating layer to render the screen layer capable of functioning in a potential-equalizing manner, through connection to ground, and to essentially enclose an electric field that arises inside the screen layer as a result of the electric conductor.

8. The installation according to claim 1, wherein the at least one inductor is completely or partially buried in the ground.

9. The installation according to claim 1, wherein the cable in the vicinity of the at least one inductor is divided into a cable part on both sides of a point of connection to the cable, the installation further comprising:
    connecting means for connection of the at least one inductor to the cable, the connecting means comprising three connection devices for connection of an end of an electric conductor of the cable parts to two of the connection devices and an end of the at least one inductor to a third of the connection devices; and a member for electrically interconnecting the three connection devices.

10. The installation according to claim 1, wherein the at least one inductor comprises a winding.

11. The installation according to claim 1, wherein the at least one inductor comprises an auxiliary winding for delivering auxiliary energy to a consumer.

12. The installation according to claim 11, wherein the auxiliary winding comprises equipment for operation of parts of the installation and communication between the parts and/or between the installation and external equipment.

13. The installation according to claim 1, further comprising:

an optical fiber laid along the cable or integrated into the cable, for use of a device for at least one of protection of the installation, commercial communication within the installation or communication with the surroundings.

14. The installation according to claim 1, wherein the ac voltage line exhibits three phases and one of the cables for each phase.

15. The installation according to claim 14, wherein the at least one inductor comprises a three-phase inductor with the cables of the respective phase connected to a separate inductor winding in a respective phase leg of a common core.

16. The installation according to claim 1, wherein the at least one cable is designed to have a system voltage of between 50 kV and 500 kV between the conductor and the screen layer.

17. The installation according to claim 1, wherein the at least one cable is designed to have a system voltage of between 30 kV and 300 kV between the conductor and the screen layer.

18. The installation according to claim 1, wherein the installation is designed for a maximum transmissible power, via the ac voltage line, of 50 MW-600 MW.

19. The installation according to claim 1, wherein the distance between said switchgear units exceeds 25 km.

20. The installation according to claim 1, wherein the installation includes at least two inductors, wherein a distance between an inductor located nearest a switchgear unit and the switchgear unit and between adjacent inductors is 5-40 km.

21. The installation according to claim 1, wherein the installation includes at least two inductors, wherein a distance between an inductor located nearest a switchgear unit and the switchgear unit and between adjacent inductors is 10-25 km.

22. The installation according to claim 1, wherein said inductor is dimensioned for a reactive power of 5-30 MVAR.

23. The installation according to claim 1, wherein the installation includes at least two inductors, wherein dimensioning of the inductors and a distance between adjacent inductors and between one of the inductors and a switchgear unit, respectively, are adapted to a magnitude of a voltage that the cable is intended to carry and a shunt capacitance/unit of length of the cable to essentially eliminate capacitive currents in the cable.

* * * * *